Dec. 3, 1940.  H. NERWIN  2,223,965
SHUTTER FOR PHOTOGRAPHIC CAMERAS
Filed June 4, 1938
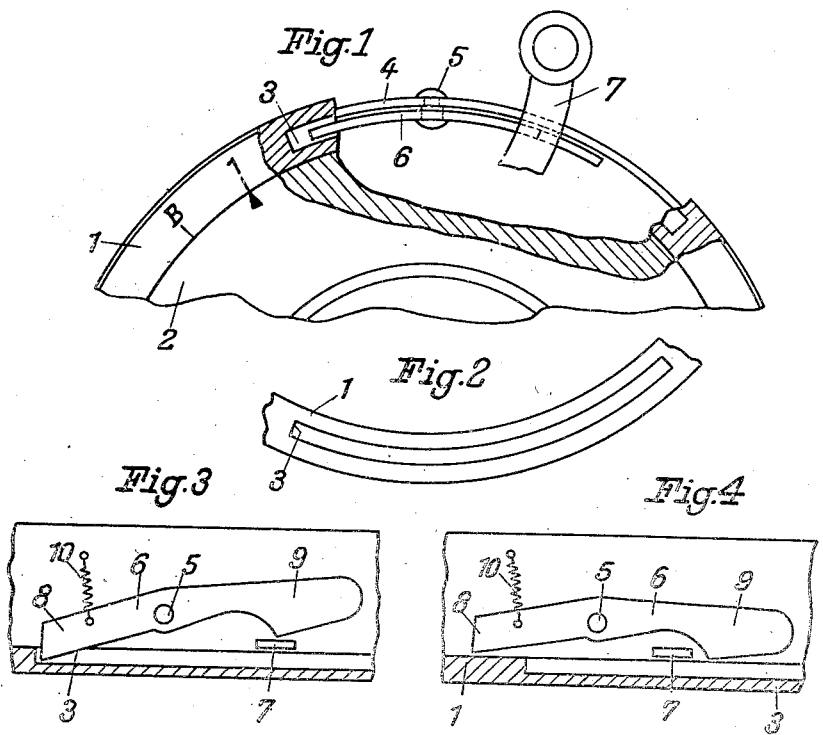
Inventor:
Hubert Nerwin
by B. Singer & F. Stern
Attorneys Patented Dec. 3, 1940

2,223,965

UNITED STATES PATENT OFFICE 2,223,965

SHUTTER FOR PHOTOGRAPHIC CAMERAS

Hubert Nerwin, Dresden, Germany, assignor to Zeiss Ikon Aktiengesellschaft, Dresden, Germany Application June 4, 1938, Serial No. 211,773
In Germany July 17, 1937

3 Claims. (Cl. 95—53)

The invention relates to improvements in shutters for photographic cameras and in particular is directed to central shutters provided with a delayed action release which is tensioned by the customary shutter tensioning lever.

In shutters of this type it has been proposed heretofore to employ a manually operable locking lever for preventing the tensioning of the delayed action release when the shutter speed setting member has been adjusted to "B" i. e. "bulb." This locking lever is adapted to be moved out of its locking position at any of the other speed values of the shutter, which usually start with one second and decrease gradually to very small fractions of one second. A disadvantage of this known arrangement is, that it is necessary to tension first the shutter and then move the locking lever out of its locking position before the delayed action release can be tensioned. Altogether there are required three manual operations before the delayed action release is tensioned. Furthermore, shutters of this type cannot be mounted in a recess of the camera, because then the delayed action release can not be actuated.

The principal object of the present invention is to provide a shutter of the type mentioned with an automatically actuated locking lever, which prevents the tensioning of the delayed action release when the shutter speed setting member has been adjusted to "B," and which alternately prevents an adjustment of the shutter speed setting member to the position "B" when the delayed action release was tensioned previously, which is only possible when the shutter was adjusted to one of the instantaneous speed values.

Another object of the invention is to provide the shutter speed setting member with means for preventing the shifting of the locking lever into a position in which the shutter tensioning lever is free to tension the delayed action release, as long as the shutter is adjusted to "B" or other predetermined speed values.

It is also an object of the invention to provide the shutter with a tensioning lever which, after having tensioned the shutter, engages the locking lever and, provided that the shutter is not adjusted to "B," shifts the locking lever during the following tensioning of the delayed action release into a position in which a subsequent change of the shutter speed to "B" is prevented, as long as the delayed action release remains tensioned.

Other objects of the invention will be apparent or will be specifically pointed out in the following description having reference to the accompanying drawing, but the invention is not limited to the two embodiments of the invention herein described, as various other forms may be adopted within the scope of the appended claims.

In the drawing:

Fig. 1 illustrates a partial front view of a central shutter, with certain wall portions broken away and other parts in sectional view, Fig. 2 illustrates in rear elevation view that portion of the shutter speed setting ring provided with a groove for receiving one end of the locking lever, Fig. 3 illustrates in plan view the locking lever when engaging the groove in the shutter speed setting ring and thus permitting a tensioning of the delayed action release, Fig. 4 illustrates in plan view the position of the locking lever in which the same prevents a tensioning of the delayed action release.

Referring to Fig. 1, the central shutter 2 is provided with a manually rotatable shutter speed setting ring 1 having in its rear face a groove 3 extending a limited distance in circumferential direction. A locking lever 6 is pivotally mounted between its ends on a pivot pin 5 attached to the casing 4 of the shutter.

The customary shutter tensioning lever 7, which also is used to tension the delayed action release after the shutter has been tensioned, engages the end 9 of the locking lever 6 and in a certain position or positions of the shutter speed setting ring 1 is adapted to move the other end 8 of the lever 6 into the groove 3, thereby preventing an adjustment of the shutter speed setting ring 1 to "B." This action takes place, when the delayed action release has been tensioned. A spring 10 which is attached to the end 8 of the locking lever 6 tends to lift the latter out of the groove 3.

In the Figs. 1 and 3, the shutter speed setting ring 1 has been adjusted, by way of example, to "1" i. e. a speed of "one second" and the shutter including its delayed action release has been tensioned as indicated by the position of the shutter tensioning lever 7, which engages the end 9 of the locking lever 6 after having moved the other end 8 into the left hand end of the groove 3. It will be noted that the spring 10 is not able to pull the locking lever 6 out of the groove 3 as long as the shutter tensioning lever 7 engages the other end 9 of the locking lever 6. Since the locking lever 6 prevents in this position a rotation of the shutter speed setting ring 1 in clockwise direction, it is impossible to adjust the shutter to "B." It is only possible to change the shutter speed to another speed value arranged on the right hand side of "1" by rotating the ring 1 anti-clockwise.

Fig. 4 illustrates the position of the shutter speed setting ring 1 when it has been adjusted to "B" i. e. "bulb" and the shutter has been tensioned. It will be noted that the locking lever 6 cannot enter the groove 3, because the end 8 of the locking lever 6 lies opposite a solid portion of the ring 1. The other end 9 of the locking lever 6 projects into the path of movement of the shutter tensioning lever 7, and although it permits a tensioning of the shutter it prevents a further movement which is necessary to tension the delay action release. Therefore, it is apparent that when the shutter speed setting ring 1 is adjusted to "B" the delayed action release is automatically cut out i. e. it cannot be tensioned by the shutter tensioning lever. On the other hand, Fig. 3 illustrates, that if the delayed action release has been tensioned by the shutter tensioning lever 7, which is only possible when the shutter setting ring 1 has been set to an instantaneous speed at which the locking lever 6 engages the groove 3, the shutter speed setting ring 1 cannot be adjusted to "B."

If it desired to prevent at certain shutter speed values the tensioning of the delayed action release, then it is only necessary to provide the groove 3 at the points corresponding to these speed values with solid portions, which will prevent an oscillation of the locking lever 6 about its pivot 5 and into the groove 3 when the lever 6 is engaged by the shutter tensioning lever 7, so that the latter cannot tension the delayed action release.

What I claim is:

1. In a photographic shutter provided with a delayed action release, a shutter casing, a rotatable shutter speed setting ring, a shutter tensioning lever adapted to tension said delayed action release in predetermined positions of said shutter speed setting ring upon completion of the tensioning of the shutter, said rotatable shutter speed setting ring being provided at one end face with a groove extending a predetermined length in circumferential direction, and a locking lever pivotally mounted between its ends on said shutter casing and extending along the circumference of said shutter speed setting ring, and along the groove in the same, spring means for urging one end of said locking lever away from said groove and the other end of said lever toward said shutter tensioning lever, the ends of said locking lever being adapted to be engaged by said shutter tensioning lever and said shutter speed setting ring respectively, said shutter tensioning lever during the tensioning of said delayed action release and when the shutter speed adjusting ring has been adjusted to anyone of said predetermined positions engages one end of said locking lever and moves its other end against the action of said spring means into the groove of said shutter speed setting ring, thereby preventing a subsequent adjustment of said shutter speed setting ring to any other than said predetermined positions as long as said shutter and delayed action release remains tensioned, said shutter speed setting ring in another predetermined position engaging one end of said locking lever so as to prevent a movement of the latter by said shutter tensioning lever, thereby locking the latter in a position in which a tensioning of said delayed action release is prevented.

2. In a photographic shutter provided with a delayed action release, a shutter casing, a rotatable shutter speed setting ring, a shutter tensioning lever adapted to tension said delayed action release in predetermined positions of said shutter speed setting ring upon completion of the tensioning of the shutter, said rotatable shutter speed setting ring being provided a one end face with a groove extending a predetermined length in circumferential direction, a locking lever pivotally mounted between its ends on said shutter casing and extending along the circumference of said shutter speed setting ring, the ends of said locking lever being adapted to be engaged by said shutter tensioning lever and said shutter speed setting ring respectively, said shutter tensioning lever during the tensioning of said delayed action release and when the shutter speed adjusting ring has been adjusted to any one of said predetermined positions engages one end of said locking lever and moves the other end of the same into the groove of said shutter speed setting ring, thereby preventing a subsequent adjustment of said shutter speed setting ring to any other than said predetermined positions, alternately, said shutter speed setting ring in other predetermined positions engaging one end of said locking lever so as to prevent a movement of the same by said shutter tensioning lever, thereby locking the latter in a position in which a tensioning of said delayed action release is prevented, and spring means engaging said locking lever for normally maintaining the locking lever in a position in which it is kept out of the said groove of said shutter speed adjusting ring, said locking lever being provided at its end engaging said shutter tensioning lever with a cam face projecting into the path of movement of said tensioning lever to be engaged by the latter at the instant the shutter has been tensioned.

3. In a photographic shutter provided with a delayed action release, a shutter casing, a rotatable shutter speed setting ring provided on one side with a groove extending a predetermined length in circumferential direction, a manually operable lever adapted for tensioning in a single continuous movement first the shutter and then said delayed action release, a locking lever pivotally supported between its ends within said shutter casing adjacent said shutter speed setting ring and extending in circumferential direction of the same along the groove in the latter, and spring means for urging one end of said lever away from said groove and the other end of said lever toward said shutter tensioning lever, said manually operable lever being arranged to actuate during its tensioning movement in predetermined positions of said shutter speed setting ring said locking lever against the action of said spring means so as to move one end of the locking lever into the groove of said shutter speed setting ring, whereby an adjustment of said shutter speed setting ring to other predetermined position is prevented as long as the shutter and delayed action release remains tensioned, said locking lever preventing in said last named other predetermined positions of said shutter speed setting ring a tensioning of said delayed action release by engaging with its before mentioned end one side face of said shutter speed setting ring when the other end of said locking lever, which normally projects into the path of movement of said normally operable lever, is engaged by the latter after the shutter has been tensioned.

HUBERT NERWIN.